United States Patent Office 3,647,639
Patented Mar. 7, 1972

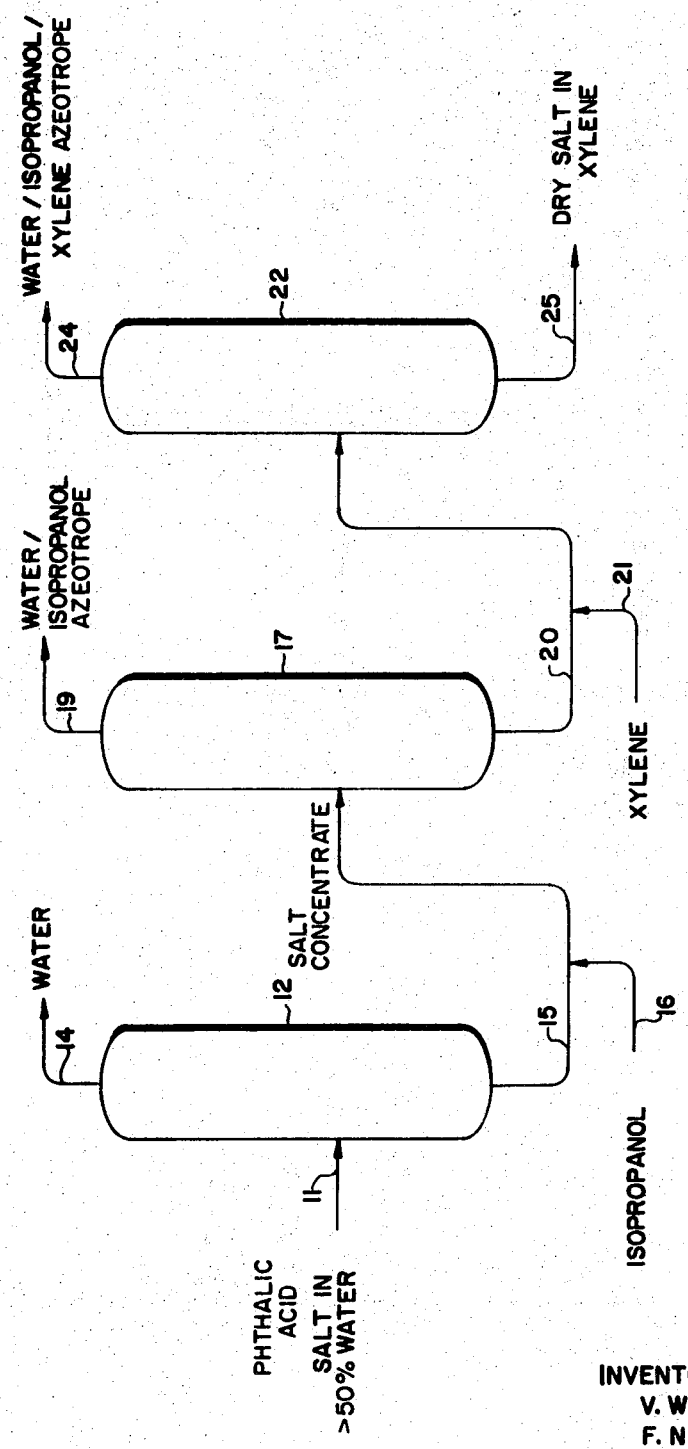

3,647,639
SALT DRYING BY PLURAL STAGE AZEOTROPIC DISTILLATION WITH PLURAL ENTRAINERS
Vernon W. Buls, Alamo, and F. Norman Grimsby, Orinda, Calif., assignors to Shell Oil Company, New York, N.Y.
Filed July 7, 1969, Ser. No. 839,556
Int. Cl. B01d 3/34
U.S. Cl. 203—14  4 Claims

ABSTRACT OF THE DISCLOSURE

Water is removed from solutions of salts of phthalic acids by a three step process wherein water is removed by consecutive non-azeotropic distillation, azeotropic distillation with a low-boiling azeotroping agent, and azeotropic distillation with a higher-boiling azeotroping agent.

BACKGROUND OF THE INVENTION

This invention relates to a method for drying salts of phthalic acids. These salts can be employed in the preparation of polymers for use in plastics and the like. In many such applications it is desirable to use a relatively water-free salt, water causing side reactions. For example, when hexahydrophthalate salts are reacted with epichlorohydrin in the presence of a suitable catalyst to form the diglycidyl ester, the presence of a trace of water leads to substantial decrease in the epoxide value of the ester product.

Copending application Ser. No. 803,102 of Buls filed Feb. 27, 1969, discloses and claims a process whereby hexahydrophthalate salts are prepared in aqueous solution. A similar process can be used to prepare the tetrahydrophthalate salts. Conventional azeotropic distillation water removal methods are impractical for drying such materials. Light azeotroping agents, such as isopropanol, must be used in substantial excess or at super-atmospheric pressures to obtain a dry product, while heavy agents, such as epichlorohydrin or hydrocarbons, for example xylene, produce dry crystalline products but in a lumpy agglomerated state, which not only are difficult to handle but also tend to be less reactive in subsequent process steps.

STATEMENT OF THE INVENTION

In accordance with the invention, water-free salts of phthalic acids are obtained with improved efficiency from aqueous solutions of the phthalic acid salt by (a) distilling said aqueous solution under controlled conditions forming an overhead comprising water and a first bottoms comprising said salt and water and having a water content of from about 10% to about 50% by weight, (b) azeotropically distilling said first bottoms in the presence of an added lower boiling azeotroping agent thereby forming an overhead comprising water and said lower-boiling azeotroping agent and a second bottoms comprising water, said salt and said azeotroping agent and containing no more than about 10% of water, and (c) azeotropically distilling said second bottoms in the presence of added higher-boiling azeotroping agent thereby forming an overhead comprising water, said lower-boiling azeotroping agent and a part of said higher boiling azeotroping agent and a third bottoms consisting essentially of said salt and said higher-boiling azeotroping agent. In a preferred application of the invention, the third bottoms is contacted with excess epichlorohydrin in the presence of a suitable catalyst to form the diglycidyl ester of the phthalic acid, with high efficiency, it being possible to directly recycle excess epichlorohydrin. In the following description of the invention reference will be had to the accompanying drawing wherein the single figure represents, more or less diagrammatically, one form of apparatus suitable for carrying out the invention.

Salt solutions

The invention is suitably applied to aqueous solutions of alkali metal salts of the saturated, partially saturated and unsaturated phthalic acids, for example the lithium, sodium, and potassium salts of ortho-phthalic acid, isophthalic acid, terephthalic acid, tetrahydrophthalic acid and hexahydrophthalic acid. It is applied with advantage to aqueous solutions of the alkali metal salts of the saturated and partially saturated phthalic acids and with particular advantage to aqueous solutions of alkali metal salts of hexahydrophthalic acids.

The invention is generally effective for all concentrations of aqueous solutions. When the starting solution contains less than about 50% by weight water the non-azeotropic first distillation may optionally be omitted, the two azeotropic distillations then generally efficiently removing the water.

Azeotroping agents

Low-boiling azeotroping agents suitably used comprise polar non-hydrocarbons having boiling temperatures below that of water, and having some water solubility. Preferred low-boiling azeotroping agents comprise alkanols having from 2 to 4 carbon atoms per molecule, such as ethanol, propanol, isopropanol, and tert-butanol. Isopropanol is most preferred.

As higher-boiling azeotroping agents may be used hydrocarbons and non-hydrocarbons having atmospheric boiling temperatures of from about 100° C. to about 175° C. Very suitable among these higher-boiling azeotroping agents are those which do not form an azeotrope with and do not react with epichlorohydrin, such as the xylenes, xylene-containing fractions, alkanes of from 8 to 11 carbons, amyl acetate, 5-methyl-1-hexanol, 1-butoxy-2-propanol and 4-heptanone. Especially preferred high-boiling azeotroping agents are the xylenes and hydrocarbon fractions having xylene as the major component.

Distillations

The initial, non-azeotropic distillation step of the process functions as a pre-concentration, and may at times be dispensed with when the feed salt solution is sufficiently concentrated. When the non-azeotropic distillation is used it is generally desirable to operate the distillation column at conditions such as to produce a liquid (non-slurry) bottoms product containing from about 10% to about 40% by weight water. Preferably the initial bottoms product contains from about 10% to about 30% by weight water, and most preferably from about 10% to about 20% by weight. This distillation is generally carried out at atmospheric or slightly super-atmospheric pressure. Sub-atmospheric pressures may be used, however, when precautions are taken to avoid crystallization of the bottoms.

Distillation of the first bottoms with the added low-boiling azeotroping agent is carried out at conditions resulting in an overhead comprising water and at least a part of said lower-boiling azeotroping agent and leaving as bottoms a mixture comprising said salt, water and the lower boiling azeotroping agent not taken overhead and containing a maximum of about 10% by weight water. Preferably the bottoms contains from about 0.2% to about 6% by weight water and still more preferably from about 1% to about 4% by weight of water.

Uniform slurry is produced as bottoms in the distillation using the lower-boiling azeotroping agent if localized low concentrations of azeotroping agent are avoided. Adding the salt mixture to the kettle slowly and/or providing agitation in the reboiler are two methods of ensuring a uniform bottoms product composition.

The bottoms obtained in the azeotropic distillation using the lower-boiling azeotroping agent are thereafter subjected to the second azeotropic distillation in the presence of the higher-boiling azeotroping agent. The second azeotropic distillation is carried out under conditions resulting in the passage of all of the remaining water and remaining lower-boiling azeotropic overhead together with a portion of the higher-boiling azeotroping agent. Bottoms retained in the second azeotropic distillation will be free of any substantial amount of water and the lower-boiling azeotropic agent and consist essentially of a slurry of the phthalic acid salt in the higher-boiling azeotroping agent. The substantially anhydrous slurry so obtained generally constitutes the final product of the process. If desired, however, all or a part of the higher-boiling azeotroping agent may be removed from the final product slurry by conventional means which may comprise one or more such steps as filtration, centrifuging, flashing and the like.

In a preferred application, the slurry of phthalic acid salt in the higher-boiling azeotroping agent is contacted with an excess of epichlorohydrin in the presence of a conventional esterification catalyst such as, for example, a quaternary ammonium halide, the higher boiling azeotroping agent providing a very suitable esterification reaction medium. Following reaction of the salt with epichlorohydrin to form the diglycidyl ester of the phthalic acid corresponding to the salt, excess epichlorohydrin can be simply recovered from the reaction medium by distillation. The excess epichlorohydrin is recovered prior to catalyst separation in a form which may be immediately recycled, no drying or further purification being necessary. The higher-boiling azeotroping agent reaction medium can then if desired be separated from the final ester by distillation.

The process of the invention may be carried out continuously, in batch operation or semi-continuously, in conventional distillation apparatus.

Referring to the drawing:

In a continuous operation an aqueous feed solution of an alkali metal salt of a phthalic acid is continuously charged to fractionator 12 through line 11. The specific feed solution here used contains 9.6 moles of water, about 0.3 moles of isopropanol and about 0.2 moles of alkali metal chloride, based on each mole of phthalic acid salt present. Fractionator 12 is operated at a kettle temperature of at least about 105° C. to prevent crystal formation in the kettle. Overhead containing about 7 moles of water and about 0.3 mol of isopropanol is separated in fractionator 12 and removed as vapor overhead through line 14. Liquid bottoms in fractionator 12 contain 2.6 moles of water and about 0.2 mole of alkali metal chloride for each mole of phthalic acid salt present. Bottoms are passed from fractionator 12 through line 15 into fractionator 17. 17.2 moles of isopropanol is charged to fractionator 17 through line 16. Overhead containing about 1.8 moles of water and 8.8 moles of isopropanol is separated in fractionator 17 and removed therefrom through line 19. A kettle temperature of about 110° C. is maintained in fractionator 17. Bottoms formed in fractionator 17, consisting essentially of a slurry composed of 8.4 moles of isopropanol, about 0.9 mole of water and about 0.2 mole of alkali metal chloride per mole of phthalic acid salt present. Bottoms are taken from fractionator 17 and transferred through line 20 to fractionator 22. 4.9 moles of xylene are charged through line 21 into line 20 leading to fractionator 22. Overhead containing the remaining water (about 0.9 mole) and about 8.3 moles of isopropanol is separated as vapor overhead in fractionator 22 and removed through line 24. Bottoms consisting of a slurry containing about 0.1 mole of isopropanol, 4.9 moles of xylene, 0.2 mole of alkali metal chloride and 1 mole of phthalic acid salt is removed through line 25 as the final product.

The following examples further illustrate the process of the invention:

EXAMPLE I

A solution of dipotassium hexahydrophthalate in water having the following composition was prepared by the method disclosed in copending U.S. application Ser. No. 803,102 of Buls, filed Feb. 27, 1969.

| | Wt. percent |
|---|---|
| Dipotassium hexahydrophthalate | 52.2 |
| Water | 40.3 |
| Potassium chloride | 3.1 |
| Isopropanol | 4.4 |

This material was slowly added as a liquid to the kettle of a distillation column containing isopropanol. This isopropanol was being refluxed at 760 mm. Hg and about 80° C. during the addition of the aqueous hexahydrophthalate salt. A fine slurry of crystalline salt was formed. Water and isopropanol were taken overhead and additional isopropanol was added. At no time did the salt become lumpy but neither did it become completely dry in isopropanol. To illustrate the ineffectiveness of isopropanol alone under these conditions, to lower the concentration of water in the distillation kettle from 25% mole to 0.3% mole would require the boiling up of 14.2 moles of isopropanol for each mole of water removed, less than one tenth this amount of boiling of xylene would give this degree of dehydration.

EXAMPLE II

The experiment of Example I was repeated, with the exception that when the concentration of water in the bottom product was lowered to 2% by weight, isopropanol addition was halted and xylene was gradually added. There was no evidence of lumping and a bone dry product resulted when the remaining water and isopropanol were overheaded. The final salt was present as a fine slurry in xylene. As the water and isopropanol were replaced by xylene, the distillation kettle temperature was gradually increased to maintain boil-up, eventually reaching about 140° C. Kettle pressure was 760 mm.

EXAMPLE III

For the purpose of comparison an aqueous solution of dipotassium hexahydrophthalate prepared in the same manner and having the same composition as that used as feed in Example I was slowly added to the kettle of a distillation column, containing xylene refluxing at 140° C. and atmospheric pressure: Xylene and water were taken overhead to result in a substantially water-free second bottoms consisting of the salt and xylene. The salt, having gone through a "wet snow" stage and adhering to the walls of the kettle, was lumpy and was difficult to remove from the distillation kettle and would not form a slurry in xylene.

We claim as our invention:

1. A process for the preparation of a substantially water-free salt of phthalic acid from aqueous solutions of said salt which comprises the steps of (a) subjecting said aqueous solution to initial distillation under controlled conditions distilling water overhead while separating a first bottoms comprising said salt and water and containing from about 30 to about 10% by weight water, (b) azeotropically distilling said first bottoms in the presence of an added low-boiling polar azeotroping agent selected from the group consisting of ethanol, propanol, isopropanol and tertiary butanol under controlled conditions azeotropically distilling overhead an azeotrope of said agent and water while separating a second bottoms comprising said salt, low-boiling azeotroping agent, and water and containing from about 0.2 to about 6.0% by weight water, and (c) azeotropically distilling said second bottoms in the presence of an added higher-boiling azeotroping agent selected from the group consisting of the xylenes, xylene-containing fractions, alkanes of from 8 to 11 carbons, amyl acetate, 5-methyl-1-hexanol, 1-butoxy-2-propanol and 4 - heptanone under conditions to effect distilling overhead an azeotrope of the remaining water and substantially all of the lower boiling azeotroping agent thereby separating a third bottoms comprising said salt and said higher-boiling azeotroping agent free of any substantial amount of water.

2. The process in accordance with claim 1 wherein said salt of phthalic acid is selected from the group consisting of alkali metal salts of ortho-phthalic acid, terephthalic acid, isophthalic acid, tetrahydrophthalic acid and hexahydrophthalic acid.

3. The process in accordance with claim 2 wherein said higher-boiling azeotroping agent is selected from the group consisting of xylenes and xylene-containing fractions.

4. The process in accordance with claim 3 wherein said alkali metal salt is a salt of hexahydrophthalic acid.

References Cited
UNITED STATES PATENTS

| | | | |
|---|---|---|---|
| 1,911,829 | 5/1933 | Lebo | 203—18 |
| 2,049,440 | 8/1936 | Gordon | 203—15 X |
| 2,286,056 | 6/1942 | Brown | 203—18 |
| 2,745,882 | 5/1956 | Hale | 260—624 |
| 2,828,335 | 3/1958 | Ferstandig et al. | 260—514 |
| 3,094,539 | 6/1963 | Bowman et al. | 203—15 X |
| 3,414,485 | 12/1968 | Speed | 203—43 |
| 1,877,991 | 9/1932 | Schwenk et al. | 260—514 |
| 3,403,170 | 9/1968 | Corson et al. | 260—514 |

WILBUR L. BASCOMB, Jr., Primary Examiner

U.S. Cl. X.R.

203—52, 60, 62, 63, 69, 70, 71; 260—514